R. VOSE.
Car-Springs.

No. 150,804.  Patented May 12, 1874.

Witnesses
W. M. Edwards
B. F. Clark

Inventor
Richard Vose
By J. P. Fitch his atty

UNITED STATES PATENT OFFICE.

RICHARD VOSE, OF NEW YORK, N. Y.

IMPROVEMENT IN CAR-SPRINGS.

Specification forming part of Letters Patent No. 150,804, dated May 12, 1874; application filed September 22, 1873.

*To all whom it may concern:*

Be it known that I, RICHARD VOSE, of the city of New York, N. Y., have invented an Improvement in Car-Springs, reference being had to the accompanying drawings forming part thereof.

Springs composed of flat bars or leaves of steel, whether curved or straight, have, so far as I am aware, hitherto been made to receive the strain of the load on them, and to be flexed in a direction transverse to the surface of the broader sides of the bars, as in the elliptic steel carriage-springs in common use.

My invention relates to a spring composed of bars or leaves of steel, arranged to take the strain and be flexed throughout their entire length in action, edgewise, or in the direction of the plane of the broader surfaces of the bar, whereby the spring thus formed has much greater strength or bearing-power, in proportion to the weight of steel used, than one in which the rods or bars are of equal vertical and transverse thickness, or than one formed of flat bars of greater width than thickness, arranged, as is usually done, to be flexed transversely to the plane of the broader surfaces or flatwise.

Figure 1:
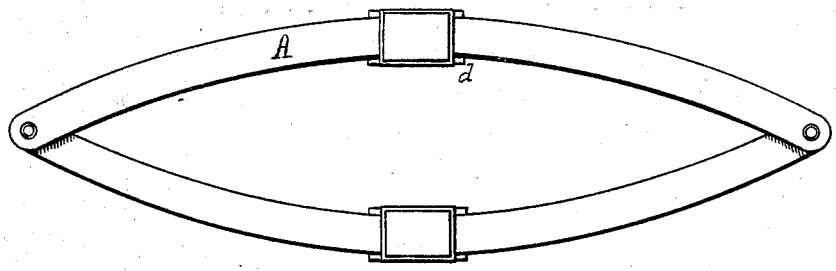
Figure 2:
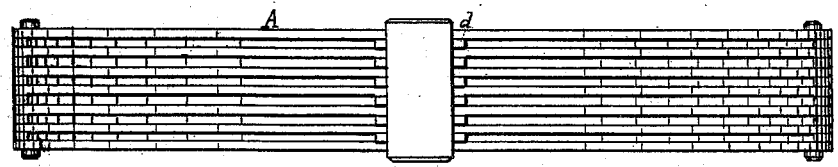
Figure 3:
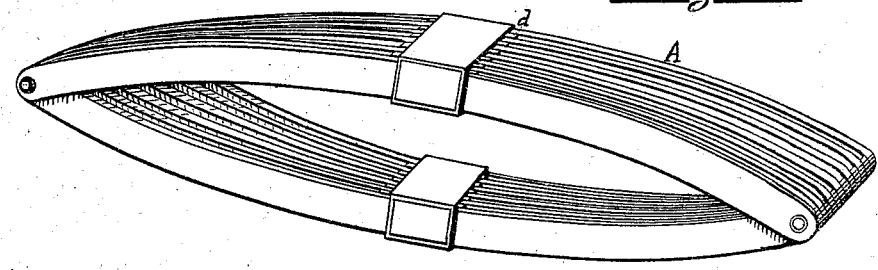

Figure 1 is a side elevation of an elliptical spring, embodying my invention. Fig. 2 is a plan, and Fig. 3 a perspective view, of the same.

As shown in the drawings, the leaves of which this spring is composed are made throughout their entire length of plates of steel of greater breadth than thickness, and entirely straight on their broad sides from end to end, or without lateral curvature or flexure or twist, the design being that when pressure is applied to the spring the leaves or plates shall take the strain throughout their entire length in the direction of their greatest width, and only in that direction. The several leaves, A, of each half of the spring being placed side by side may be in contact with each other, but preferably separated by division-plates *d* placed between them at the center of the spring, as shown. The ends may be arranged, as shown, each top one between two of the lower ones, or in any other way preferred, and they may be secured together by a bolt passing through them, or by any other known method; and the leaves of each half should be clamped together in the center, as shown, to secure them in their proper position, so that when loaded they will not be liable to be laterally twisted or flexed, but made to act in the direction of their greatest width.

It is evident that a half-elliptical spring may be formed by merely separating the two halves of the spring, and using either. It is evident, also, that, in order to embody the principle of my invention, it is not essential that the leaves or plates of the spring should be curved so as to form an elliptical or half-elliptical spring. They may be straight edgewise, as well as sidewise. A number of straight leaves of greater breadth than thickness clamped together with their ends resting upon supports, and pressure applied at the center or with their centers resting upon a support, and pressure applied at the ends, so that they will take the strain in the direction of their greatest width, will also embody the principle of my invention.

I am aware that carriage-springs have been made, composed of ribs placed side by side and clamped together; but so far as my knowledge extends, such ribs have been either round or square, or of greater vertical width than thickness. In the center they have been tapered or reduced in vertical width from the center toward the ends to such extent that, at and for a considerable distance from the ends, their horizontal has exceeded their vertical thickness, thus constituting them in form and action, throughout such portions, the common leaf-spring.

I find by experiment that while the plates composing my spring may be without essential injury somewhat tapered in width from the center toward the ends, still it is preferable that they should be of uniform vertical width throughout, and that it is essential that no portion of such width be so far reduced that it is less than the transverse thickness. Inasmuch as the spring, as a whole, is only as strong as its weakest points, if any part is made to take the strain flatwise, like the common leaf, it makes the spring, as a whole, equivalent only to a common leaf-spring. I limit my claim, therefore, to a spring whose ribs are of greater breadth than thickness, substantially throughout their entire length.

I claim as my invention—

A vehicle-spring formed of several leaves of metal, of greater width than thickness throughout their entire length, combined to take the strain and be flexed in the direction of their width, as and for the purpose specified.

RICHD. VOSE.

Witnesses:
WM. R. PALMER,
JNO. C. GUIBERT.